(12) United States Patent
Nakamura et al.

(10) Patent No.: US 6,988,831 B2
(45) Date of Patent: Jan. 24, 2006

(54) BEARING STRUCTURE

(75) Inventors: Takashi Nakamura, Saitama (JP);
Naoyuki Wakizaka, Saitama (JP);
Keiichi Furukawa, Osaka (JP);
Hideyuki Nakanishi, Osaka (JP)

(73) Assignees: Honda Giken Kogyo Kabushiki Kaisha, Tokyo (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/880,081

(22) Filed: Jun. 14, 2001

(65) Prior Publication Data

US 2002/0006237 A1  Jan. 17, 2002

(30) Foreign Application Priority Data

Jun. 14, 2000  (JP)  .............................. 2000-178671

(51) Int. Cl.
*F16C 33/58*  (2006.01)
(52) U.S. Cl. ..................................... 384/513
(58) Field of Classification Search ................ 384/513, 384/569, 537, 584, 452
See application file for complete search history.

(56) References Cited

U.S. PATENT DOCUMENTS 3,455,614 A * 7/1969 Dickinson .................. 384/457
4,934,839 A * 6/1990 Chi ............................ 384/477

FOREIGN PATENT DOCUMENTS

JP  11-2298  1/1999

* cited by examiner

*Primary Examiner*—Lenard A. Footland
(74) *Attorney, Agent, or Firm*—Armstrong, Kratz, Quintos, Hanson & Brooks, LLP

(57) ABSTRACT

Either an inner ring or an outer ring is formed to protrude in the direction of the rotation axis more than the other of outer ring or inner ring. For example, the bearing 12 is supported by the bearing housing 11a on the outer peripheral face 12b of the outer ring, and rotatably supports the hub 31a on the inner peripheral face 12a of the inner ring. In this bearing 12, the inner ring is formed to be longer and protrude further than the outer ring in the direction of the rotation axis, and an engagement/support face 12c for enagageably supporting the drive sprocket 92 is formed on the outer periphery of the inner ring formed to protrude as described above. The drive sprocket 92 is able to secure the coaxiality thereof by the engagement with the engagement/support face 12c, and receive the transmittance of rotating torque by engaging with the hub-side spline 31c on the spline 92c.

13 Claims, 6 Drawing Sheets

BEARING STRUCTURE

FIELD OF THE INVENTION

The present invention relates to the structure of a bearing comprising an inner ring, an outer ring, and a rolling element rotatably sandwiched between such inner ring and outer ring, and which is capable of supporting a first member mounted on the inner periphery of the inner ring and a second member mounted on the outer periphery of the outer ring in a relative and rotatable manner.

BACKGROUND OF THE INVENTION

A typical antifriction bearing as described above is widely used as a radial ball bearing, cylindrical roller bearing, needle roller bearing, and so on. For example, often used in vehicles are antifriction bearings which are arranged between a rotor rotatably driven by the driving force of the engine and a housing supporting such rotor, and which rotatably support the rotor in the housing. As an example of a rotor which is rotatably driven by the driving force of an engine, there is a torque converter, and, for example, Japanese Patent Laid-Open Publication No. Hei 11-2298 discloses a belt-type gearless drive mechanism comprising a torque converter on the input side of the transmission.

A torque converter is a hydrodynamic power transmission device disposed between the engine and transmission, and transmits the rotational driving force of the engine to the transmission. A representative cross section thereof is as shown in FIG. 7, and comprises the principle structural elements of pump impellers (hereinafter "pumps") arranged to face each other in a converter case filled with hydraulic fluid; a turbine runner (hereinafter "turbine"); and a stator 133 disposed between the turbine outlet and the pump inlet. The pumps are connected with bolts to a drive plate 136 of the engine output shaft Es (crank shaft) together with converter cases 134 (134a, 134b) to which a pump impeller 131 is fixed, and are integrally and rotatably driven together with the drive plate 136 by the rotation of the engine output shaft Es. The turbine is spline-engaged to the input shaft 20 of the transmission with a turbine runner hub 132a connected to the turbine runner 132.

A pump impeller hub 131a is integrally connected to the bore side of the converter case 134 to which the pump impeller 131 is fixed, and the pump is rotatably and axially supported by a radial ball bearing 112 disposed between an engagement shaft formed around the outer periphery of the pump impeller hub 131a and a bearing housing formed on the bulkhead 111 of the transmission case. The drive gear 192 of the hydraulic pump for generating hydraulic pressure necessary for transmission operation and lubrication of the respective components is disposed adjacent to the bearing engagement of the pump impeller hub 131a.

With the torque converter 130 as constituted above, the pump impeller 131 turns pursuant to the rotation of the engine output shaft Es, and the hydraulic fluid filled internally is force fed from the outlet of the pump periphery to the inlet of the turbine runner 132 periphery. The force fed hydraulic fluid pressurizes the turbine runner 132 and turns the turbine, and rotates the spline-engaged transmission input shaft 20 with the integrally connected turbine hub 132a. The stator 133 is connected to the bulkhead 111 of the transmission case via a one-way clutch 137 and a shaft member 140, and rectifies the dynamic pressure of the excess hydraulic fluid in the turbine 132 and supplies this to the pump 131 in order to increase the pump torque.

Nevertheless, with the aforementioned conventional antifriction bearing, generally, the width of the inner ring and outer ring, which sandwiches and relatively rotates the rolling element, in the rotation axis direction is formed in approximation, and the back face engaged with and supported by the bearing can only be provided to the two faces; namely, the engagement face on the inner periphery of the bearing and the engagement face on the outer periphery of the bearing (in other words, the shaft side engagement face on the inner periphery of the inner ring and the hole side engagement face on the outer periphery of the outer ring). Thus, members capable of being supported by the bearing were limited to the shaft-side member (aforementioned pump impeller hub 131a for example) to be engaged with the inner periphery of the inner ring and the hole-side member (aforementioned bulkhead 111 of the transmission case for example) to be engaged with the outer periphery of the outer ring, and it was not possible to support members other than those described above.

Therefore, as with the drive gear or drive sprocket which drives the hydraulic pump, upon attempting to support a rotation member which is arranged on the same axis as with the rotation axis of a rotor and rotates in the same manner as with the rotation axis, it is necessary to provide an engagement member for engageably supporting the rotation member to the rotation axis side, and there is a problem in that the structure of the rotation axis becomes complex. Moreover, upon supporting the rotation member with only a spline engagement and without providing an engagement member as described above, there is a problem in that clearance between the male and female spline would rattle, thereby causing vibration and noise from the engagement. This type of problem does not only concern the axis side but also extends to the hole side, and, for example, there is a problem in that the housing structure would become complex when the outer ring is rotatably driven or when attempting to provide an axis seal member or the like on the same axis in relation to the rotation axis.

SUMMARY OF THE INVENTION

Thus, an object of the present invention is to provide a bearing structure capable of supporting, in addition to a shaft-side member to be engaged with the inner periphery of the inner ring and a hole-side member to be engaged with the outer periphery of the outer ring, a third member on the same axis as well.

Another object of the present invention is to provide a bearing structure capable of simplifying the structure of such shaft-side member and hole-side member.

With the present invention, the bearing structure comprises: an inner ring (an inner race for example); an outer ring (an outer race for example) disposed on the outer periphery of the inner ring; and a rolling element (ball or roller for example) rotatably sandwiched between the inner ring and the outer ring; and which is capable of supporting a first member (pump impeller hub 31a in the embodiment for example) mounted on the inner periphery of the inner ring and a second member (bulkhead 11 in the embodiment for example) mounted on the outer periphery of the outer ring in a relatively rotatable manner; wherein at least the inner ring or the outer ring is formed to protrude more in the rotation axis direction in the aforementioned relative and rotatable manner than the other outer ring or inner ring; and wherein either a supporter for engageably supporting a third member (drive sprocket 92 in the embodiment for example) which integrally rotates with the inner ring or outer ring or which stands still is formed on the outer periphery of the inner ring formed to protrude in the direction of the rotation axis or on the inner periphery of the outer ring formed to protrude in the direction of the rotation axis.

In the aforementioned constitute, the inner ring for example is formed to protrude longer than the outer ring in the direction of the rotation axis, and the bearing structure is configured by forming a supporter for engageably supporting the third member which integrally rotates with the outer periphery of the inner ring formed to protrude in this way (or which stands still). In other words, the bearing structure of the present invention is configured such that the inner ring (or outer ring) is formed longer than the outer ring (or inner ring; the description is hereinafter omitted as the same is applied hereunder) in the width direction of the bearing, and a supporter (hereinafter "third supporter") for engageably supporting the third member is formed on the outer periphery of the inner ring protruding in the width direction as described above. Therefore, in addition to the shaft-side member engaged with the inner periphery of the inner ring and the hole-side member engaged with the outer periphery of the outer ring, it is possible to support a separate third member on the same axis. As a result, provided is a simple bearing structure capable of achieving the aforementioned objects.

Moreover, it is preferable that the third member engages with and is supported by a supporter formed on the outer periphery of the inner ring or a supporter formed on the inner periphery of the outer ring; and is also spline-engaged with the first member mounted on the inner periphery of the inner ring or the second member mounted on the outer periphery of the outer ring. For example, it is preferable that the aforementioned third member is engaged and supported by the third member supporter formed on the outer periphery of the inner ring and spline-engaged with the first member mounted on the inner periphery of the inner ring. According to this type of structure, the third member is able to secure the coaxiality of the mount position with the first and second members by being engageably supported by the third member support formed on the bearing, and receive the transmittance of the rotational driving force of the first member by spline-engaging with such first member. Accordingly, it is possible to provide a simple bearing structure capable of solving the aforementioned problems without complicating the structure of the rotation axis and the like and without generating vibration or noise.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
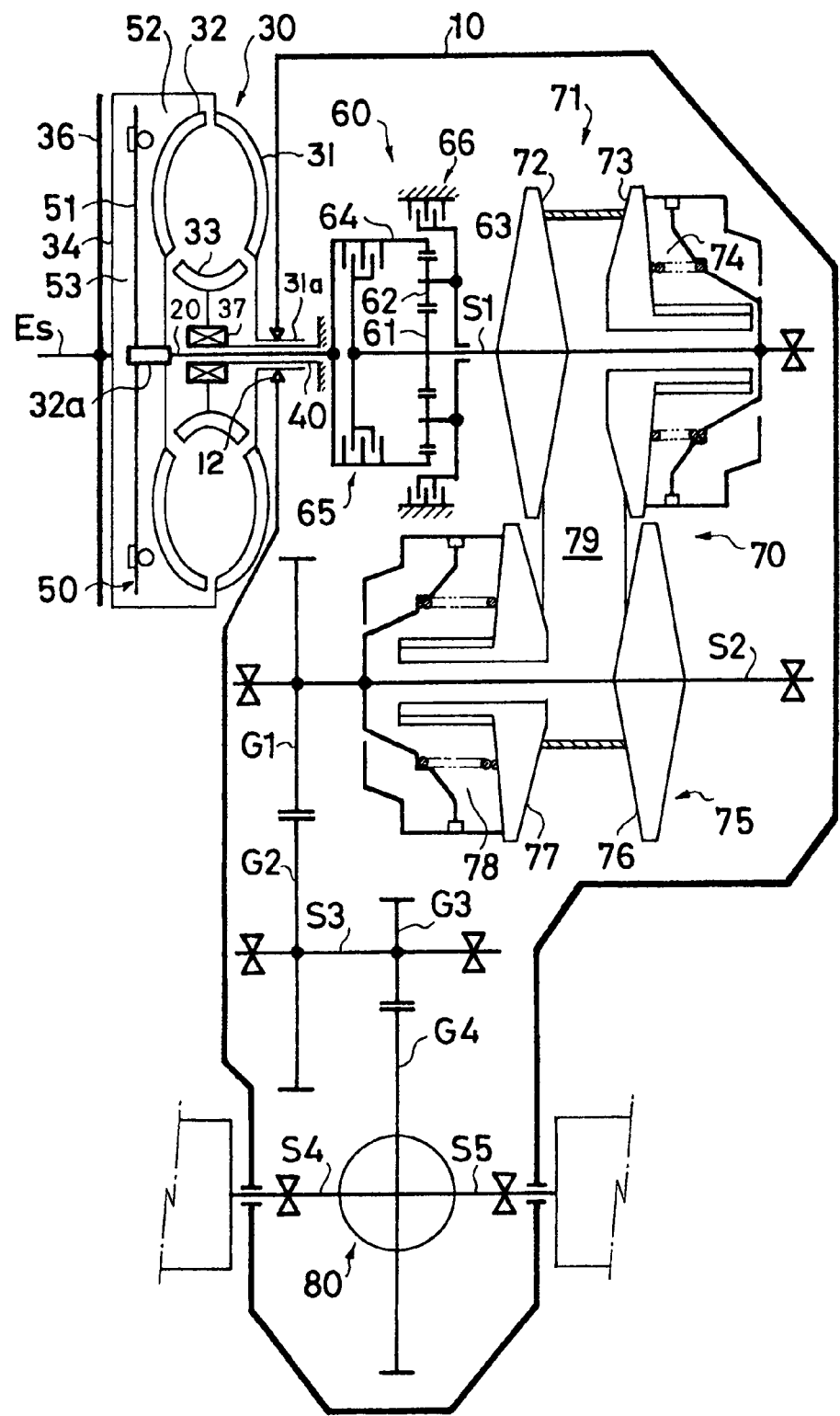
FIG. 1 is a schematic diagram showing the structure of a gearless drive mechanism for vehicles employing the bearing structure according to the present invention as a torque converter bearing.

The preferred embodiments of the bearing structure according to the present invention are now described with reference to the relevant drawings. In the ensuing embodiments, the bearing of this invention is employed as the bearing which rotatably supports the torque converter pump, and, foremost, the gearless drive mechanism for vehicles employing this torque converter is briefly explained with reference to FIG. 1.

This transmission is housed in a transmission case 10, and an input shaft 20, a primary shaft S1, a secondary shaft S2, a counter shaft S3, a left axel shaft S4 and a right axel shaft S5 are rotatably supported by a bearing mounted on the transmission case 10, respectively. Here, the input shaft 20 and the primary shaft S1 are disposed on the same axis, and the secondary shaft S2 is positioned in parallel with and a prescribed distance away from the input shaft 20 (or the primary shaft S1). The counter shaft S3 is positioned in parallel with and a prescribed distance away from the secondary shaft S2, and the left and right axel shafts S4 and S5 are set on the same axis and positioned in parallel with and a prescribed distance away from the counter shaft S3.

Rotational driving force from an engine not shown is input to the input shaft 20 via a torque converter 30. The torque converter 30 is structured of a pump with a pump impeller 31, a turbine with a turbine runner 32, and a stator 33. The pump impeller 31 is connected to the converter cases 34 (34a, 34b) covering the outer periphery thereof, and mounted on the crank shaft Es of the engine via a drive plate 36 to which the starter gear is mounted. The turbine runner 32 is engaged, via an integrally connected turbine runner hub 32a, with the input shaft 20 with a spline formed on such hub and the input shaft 20, and the stator 33 is mounted on the shaft member 41 via a one-way clutch 37.

Figure 2:
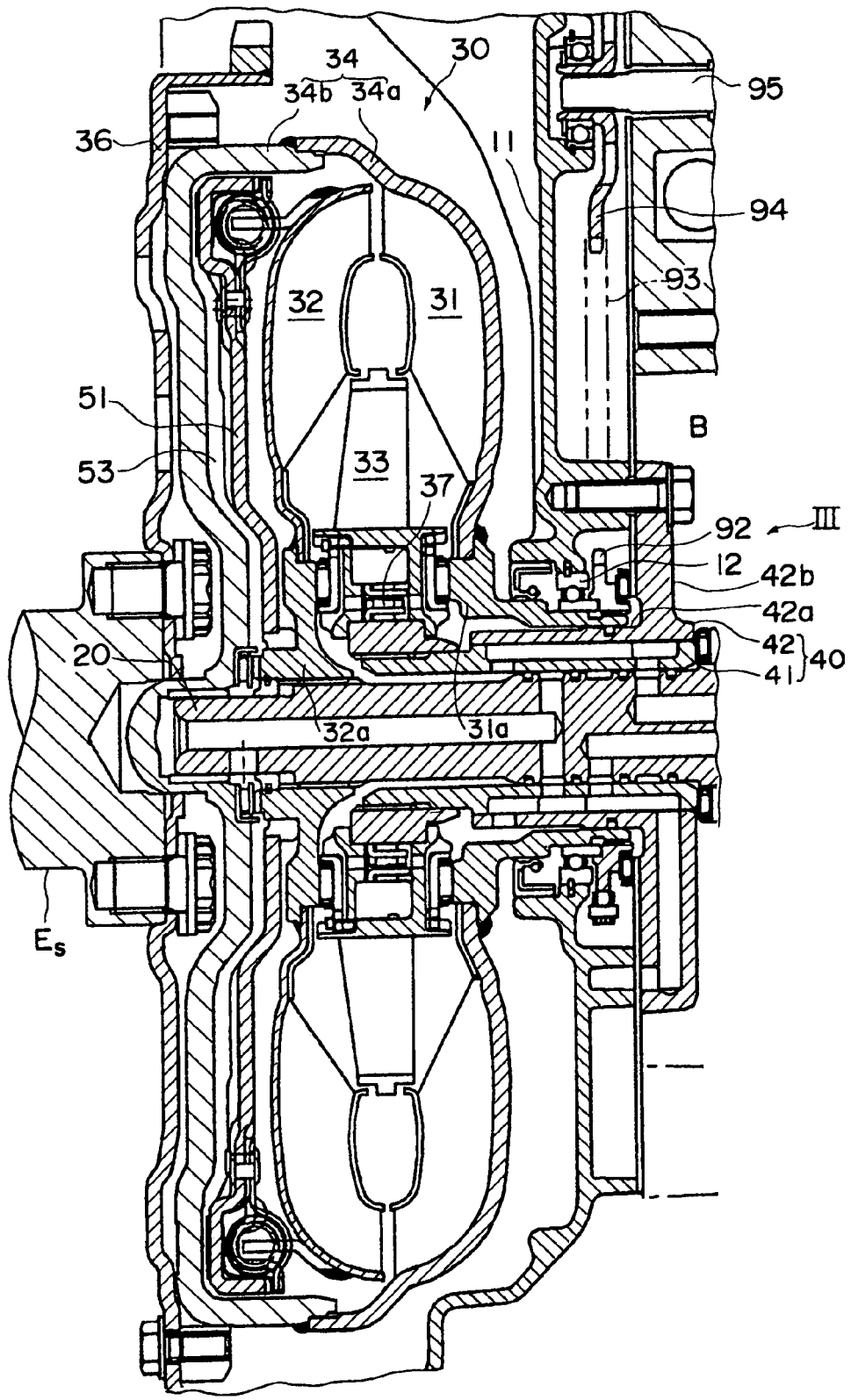
FIG. 2 is a cross section showing an enlarged view of the periphery of the torque converter in the aforementioned gearless drive mechanism for vehicles.

As circumstantially shown in FIG. 2, a stator shaft 40 is structured of a shaft member 41 position on the outer periphery face of the input shaft 20 and to which the stator 33 (and one-way clutch 37) is mounted, and a flange member 42 formed integrally by the shaft member 41 being press-fitted therein. The stator shaft 40 is fixed with a bolt B to the bulkhead 11 of the transmission case 10 in the flange 42b of the flange member 42.

A pump impeller hub 31a extending to the outer peripheral face of the flange member 42 is connected to the converter case 34a to which the pump impeller 31 is connected. The outer peripheral face of this hub 31a is engaged with the radial ball bearing 12 provided between the aforementioned bulkhead 11 and rotatably supported by the transmission case 10. Thus, the input shaft 20, stator shaft 40 and impeller hub 31a are all positioned on the same axis.

A drive sprocket 92 is mounted on the right end side of the pump impeller hub 31a, and is connected via a chain 93 to a following sprocket 94 mounted on the rotor shaft 95 of the hydraulic pump for supplying hydraulic fluid to the torque converter 30, transmission mechanism, and so on. The bearing structure of the pump impeller hub 31a and the drive sprocket 92 structured as above shows an example of the bearing structure of the present invention, and the details thereof will be explained later.

The torque converter 30 comprises a lockup mechanism 50, which presses a lockup clutch piston 51 mounted on the turbine runner hub 32a to the inner face of the converter case 34 and engages such piston 51 and case 34, thereby transmitting the driving force from the engine directly to the input shaft 20. The actuation of such lockup clutch piston 51 is conducted by supplying and draining oil to and from the two oil chambers formed by the lockup clutch piston 51 separating the space inside the torque converter 30; in other words, an oil chamber 52 (hereinafter "turbine-side oil chamber 52") formed on the side of the turbine runner 32 rather than the lockup clutch 51, and an oil chamber (hereinafter "cover-side oil chamber 53") formed on the side of the converter case 34 rather than the lockup clutch piston 51.

The driving force of the input shaft 20 is transmitted to the primary shaft S1 via a forward/reverse switching mechanism 60. As shown in FIG. 1, the forward/reverse switching mechanism 60 is constituted by comprising a sun gear 61 fixed to the primary shaft S1, a plurality of pinion gears 62 circumscribing the sun gear 61, a carrier 63 freely rotatable to the primary shaft S1 and which rotatably supports the plurality of pinion gears 62, and a ring gear 64 fixed to the input shaft 20 and inscribing the plurality of pinion gears 62. The primary shaft S1 and the ring gear 64 are engageable by hydraulic actuation of the forward clutch 65 and the carrier 63 and the transmission case 10 are engageable by hydraulic actuation of the reverse brake 66.

Here, upon engaging the forward clutch 65 and releasing the reverse brake 66, the primary shaft S1 rotates in the same direction as the input shaft 20 as the input shaft 20, ring gear 64, pinion gears 62, sun gear 61 and carrier 63 rotate integrally. And, upon releasing the forward clutch 65 and engaging the reverse brake 66, the primary shaft S1 rotates in the opposite direction as the input shaft 20 since the rotation of the input shaft 20 is transmitted by the carrier 63 to the sun gear 61 via the pinion gears 62 to which the rotation axis is fixed.

The driving force of the primary shaft S1 is transmitted to the secondary shaft S2 via a drive-side pulley 71 provided on the primary shaft S1, a driven-side pulley 75 provided on the second shaft S2, and a belt-type gearless drive mechanism 70 structured of a metal V belt 79 placed around such pulleys 71 and 75.

The drive-side pulley 71 is structured from a fixed hemi-pulley 72 fixed to the primary shaft S1 and a movable hemi-pulley 73 provided axially and slidably on the primary shaft S1 while facing the fixed hemipulley 72. The spacing (pulley width) between the fixed hemi-pulley 72 and the movable hemi-pulley 73 may be changed by supplying and discharging oil to and from the hydraulic cylinder 74 and moving the movable hemi-pulley 73 thereby. Moreover, the driven-side pulley 75 is structured from a fixed hemi-pulley 76 fixed to the secondary shaft S2 and a movable hemi-pulley 77 provided axially and slidably on the secondary shaft S2 while facing the fixed hemi-pulley 76. The spacing (pulley width) between the fixed hemi-pulley 76 and the movable hemi-pulley 77 may be changed by supplying and discharging oil to and from the hydraulic cylinder 78 and moving the movable hemi-pulley 77 thereby. The winding radius of the metal V belt 79 may be changed by adjusting the pulley width of both pulleys 71 and 75, and the transmission gear ratio between both shafts S1 and S2 may be changed in non steps.

The driving force input from the secondary shaft S2 is transmitted to the counter shaft S3 via gear G1 and gear G2, and further transmitted to the differential mechanism 80 via a final drive gear G3 and a final driven gear G4. The differential mechanism 80 divides and transmits the input driving force to the left and right front axel shafts S4 and S5 in order to drive the left and right wheels (front wheels) not shown provided on the respective ends of both shafts S4 and S5.

With the aforementioned transmission, the driving force of the engine input from the input shaft 20 via the torque converter 30 is transmitted to the left and right front wheels via the forward/reverse switching mechanism 60 and belt-type gearless drive mechanism 70, thereby allowing the vehicle to travel. By actuating the aforementioned belt-type gearless drive mechanism 70, an arbitrary transmission gear ratio can be obtained in non steps. Further, the switching of the traveling direction of the vehicle is actuated with the forward/reverse switching mechanism 60.

Figure 3:
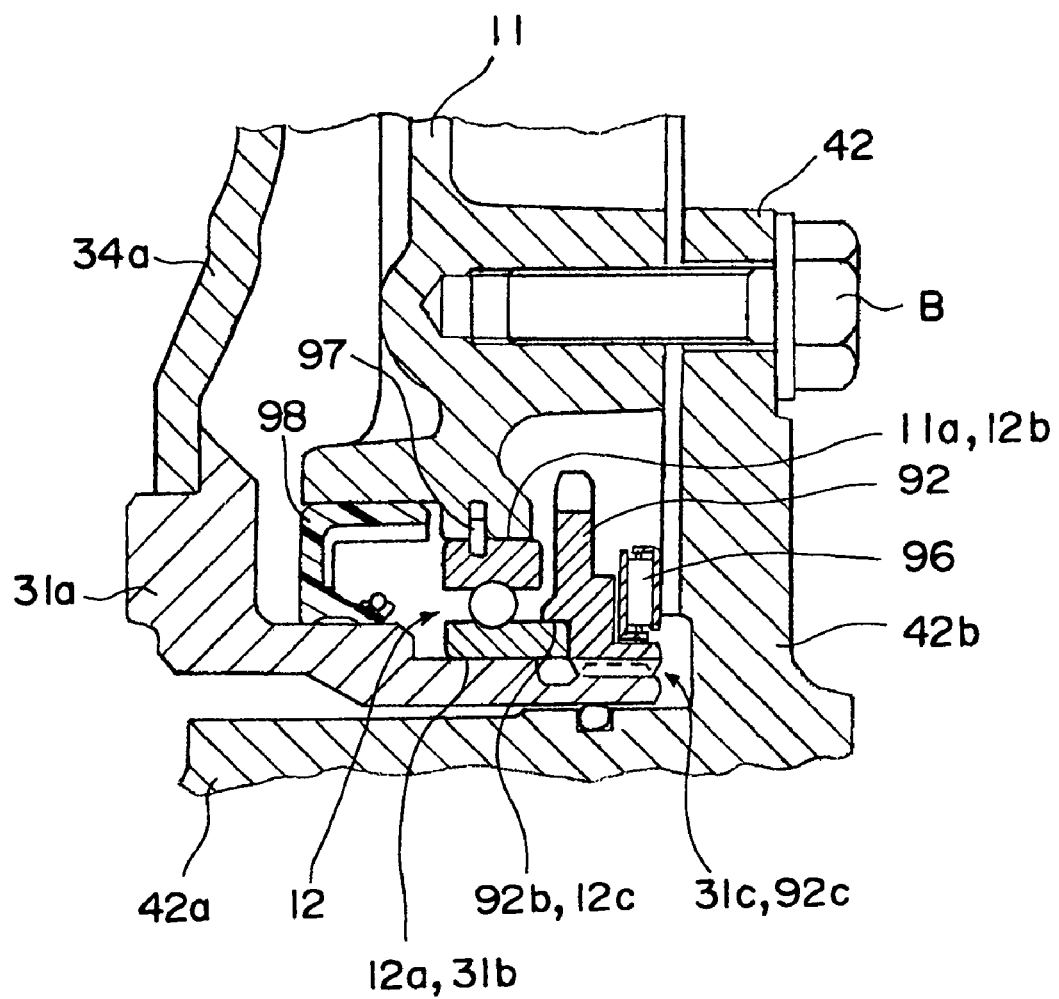
FIG. 3 is a cross section showing an enlarged view of the aforementioned torque converter bearing.

Next, the pump impeller hub 31a and the drive sprocket 92 employing the bearing structure according to the present invention are now described in detail with reference to FIG. 3 and FIG. 4. Foremost, FIG. 3 is a diagram showing an enlarged view of the vicinity of the bearing of the pump impeller hub 31a.

An engagement shaft 31b for engaging with the inner periphery of the inner ring of the radial ball bearing 12 (corresponds to the bearing indicated in the claims; hereinafter simply "bearing") and a hub spline 31c for engaging with the drive sprocket 92 are formed on the right end side of the pump impeller hub 31a. A bearing housing 1a for engageably supporting the outer periphery of the outer ring of the bearing 12 is formed on the bulkhead 11 of the transmission case facing the engagement shaft 31b at the outer periphery of the pump impeller hub 31a. A groove for mounting a snap ring which controls the thrust direction of the outer ring of the bearing 12 is formed on the inner periphery of the bearing housing 11a.

The bearing 12 is inserted in the bearing housing 11a structured as above, and, by the snap ring 97 controlling the movement toward the thrust direction, is mounted thereto. In addition, the engagement shaft 31b of the pump impeller hub is engageably supported by the inner periphery of the bearing, and the torque converter pump is rotatably supported by the transmission case 10.

Figure 4:
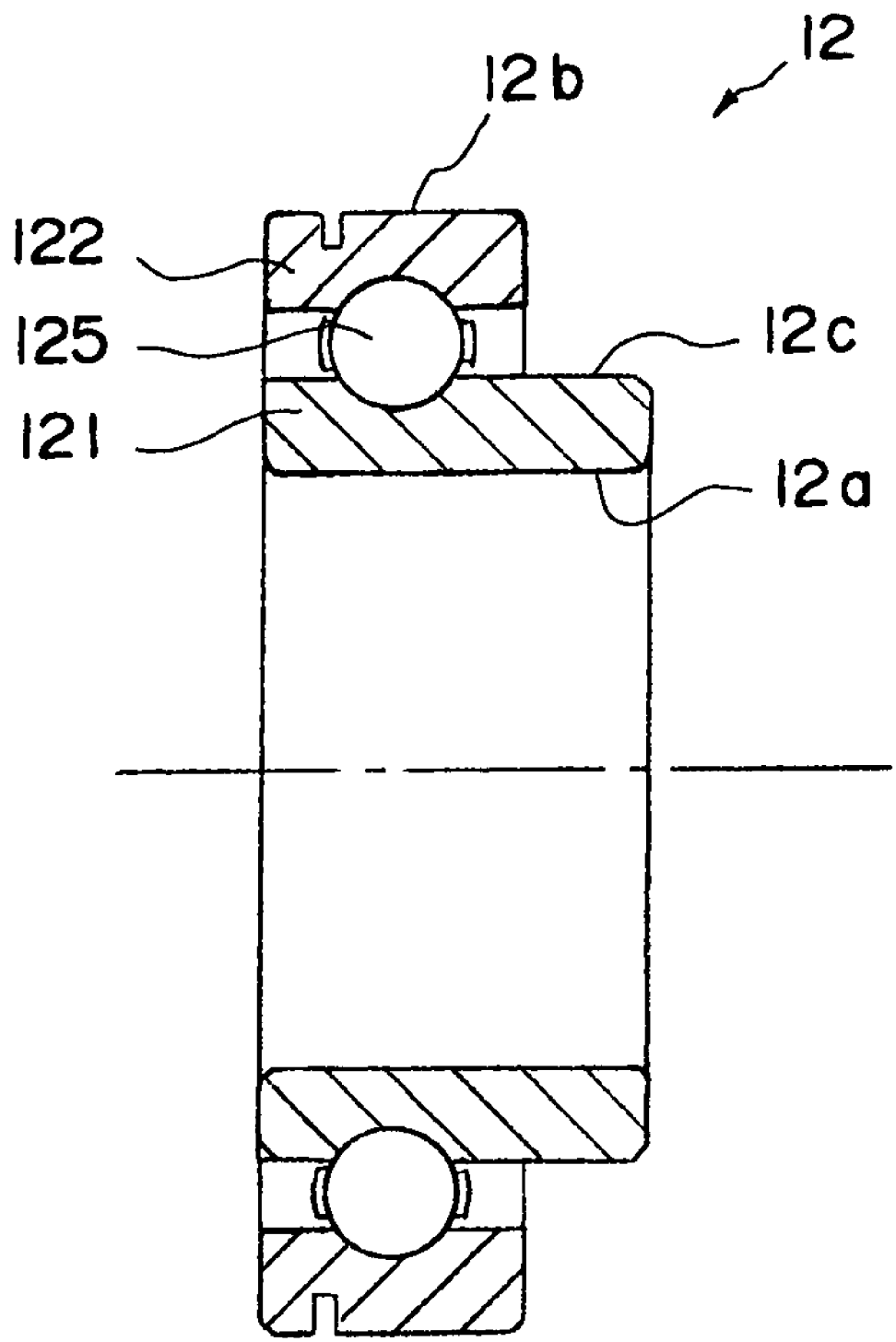
FIG. 4 is a cross section of the ball bearing employed in the aforementioned bearing.

The bearing 12, as shown with the cross section in FIG. 4 regarding the rotation axis direction thereof, is structured by comprising an inner ring 121, an outer ring 122, and a ball 125 which is rollable on the raceway surface of and rotatably sandwiched between such bearing rings 121 and 122. The width of the inner ring 121 of the bearing 12 is longer than the width of the outer ring 122 and protrudes toward the rotation axis direction, and a rotation member face 12c is formed on the outer peripheral face of such protruding inner ring.

In other words, the bearing 12 is structured by comprising a first rotation member face 12a for engageably supporting the engagement shaft 31b of the pump impeller hub (corresponds to the first member in the claims) at the inner periphery of the inner ring 121, a second rotation member face 12b which is engageably supported by the bearing housing 11a of the bulkhead 11 (corresponds to the second member in the claims) at the outer periphery of the outer ring 122, and a third rotation member face 12c capable of engageably supporting another shaft-side member (corresponds to the third member in the claims) at the outer periphery of the inner ring 121. The rotation member face 12c is formed with the same shaft center as the rotation member 12a of the inner periphery, and the member to be supported by this rotation member face 12c is engageably supported by the same shaft center as the member supported at the inner periphery of the inner ring.

A sprocket engagement 92b for engaging with the aforementioned third rotation member face 12c is formed on the left end face of the drive sprocket 92, and a sprocket spline 92c for engaging with the hub spline 31c formed at the shaft end of the pump impeller hub 31a is formed on the inner periphery of the drive sprocket 92.

The drive sprocket 92 is engageably supported by the rotation member 12c of the bearing 12 at the sprocket engagement 92b, mounted on the sprocket spline 92c by being engaged with the hub spline 31c of the pump impeller hub 31, and rotatably supported together with the pump impeller hub 31a by the bearing housing Ha of the bulkhead. A flange face is formed on the side face of the drive sprocket 92, and the drive sprocket 92 is rotatably sandwiched between the inner ring 121 and the flange 42b by a thrust bearing 96 disposed between the aforementioned flange face and the flange 42b of the flange member 42. An oil seal 98 is provided between the bulkhead 11 and the pump impeller hub.

With the bearing structure described above, the drive sprocket 92 is supported on the same rotation axis as with the pump impeller hub 31a by being engageably supported by the rotation member face 12c, and receives the transmission of rotating torque from the pump impeller hub 31a by being spline engaged thereto. Thus, without having to complicate the shaft-end structure of the pump impeller hub or generate vibration, noise and the like, it is possible to obtain a bearing structure in an extremely simple and small configuration which is capable of coaxially supporting the third member and transmitting torque thereby.

Figure 5:
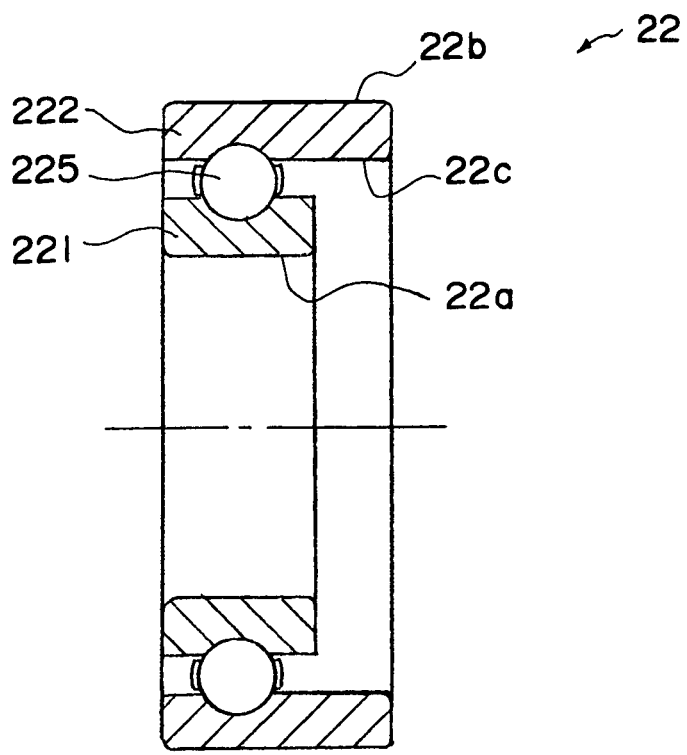
FIG. 5 is a cross section of the ball bearing showing another embodiment of the bearing structure according to the present invention.
Figure 6:
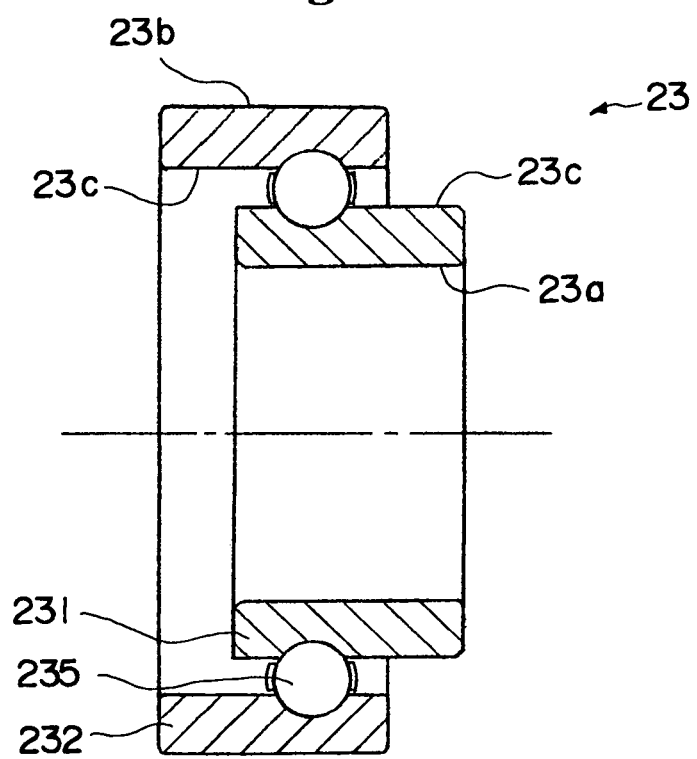
FIG. 6 is a cross section of the ball bearing showing another embodiment of the bearing structure according to the present invention.
Figure 7:
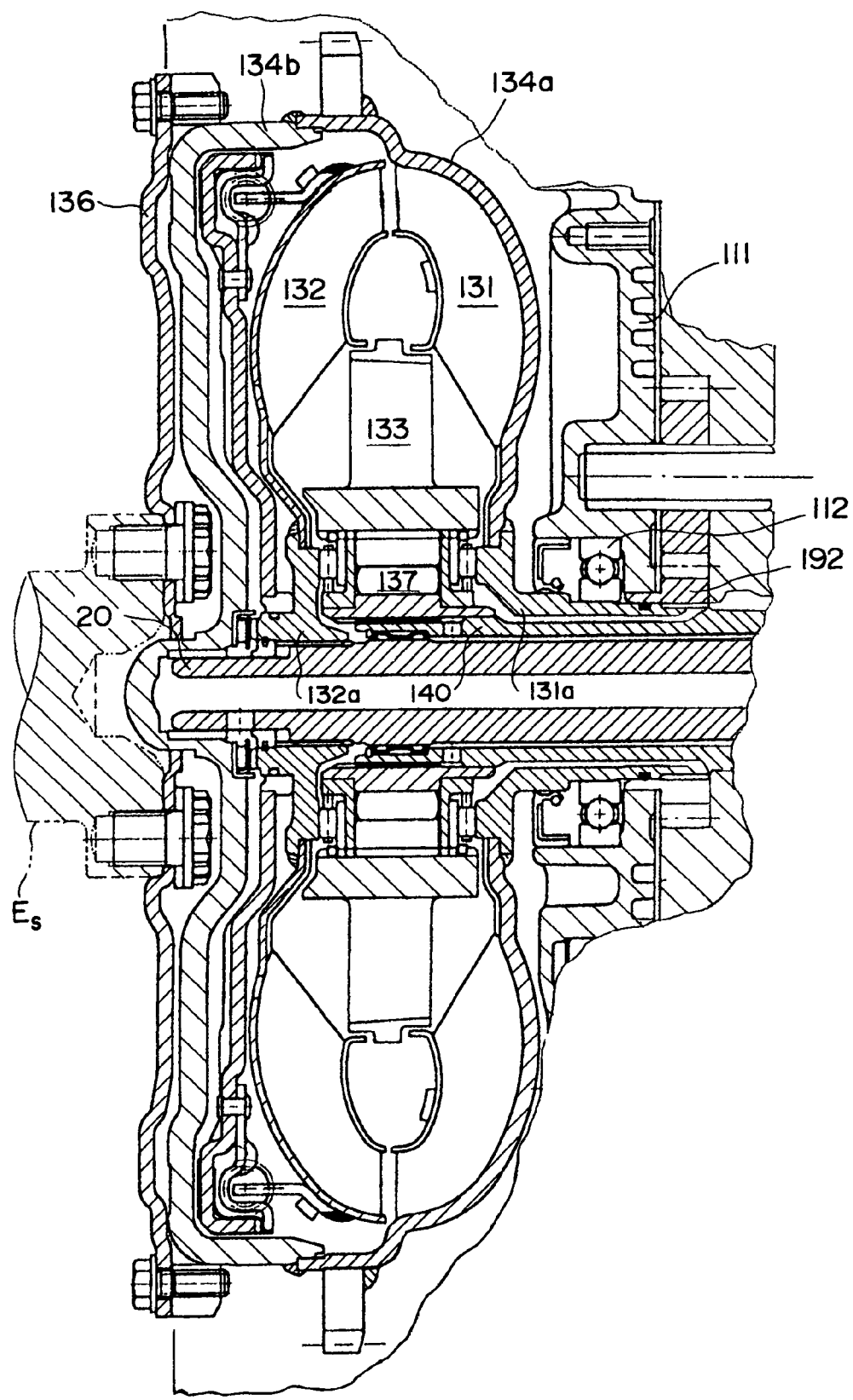
FIG. 7 is a cross section showing an enlarged view of the periphery of the torque converter in a conventional gearless drive mechanism for vehicles.

Next, FIG. 5 and FIG. 6 illustrate other embodiments of the bearing structure according to the present invention. Among these diagrams, the bearing 22 shown in FIG. 5 comprises an inner ring 221, an outer ring 222, and a ball 225 which is rollably and rotatably sandwiched between such bearing rings 221 and 222. The width of the outer ring 222 is longer than the width of the inner ring 221, and an a third rotation member face 22c is formed on the inner peripheral face of such protruding outer ring 222. This bearing 22 comprises a first rotation member face 22a for engageably supporting the shaft-side member (corresponds to the first member in the claims) at the inner periphery of the inner ring 221, a second rotation member face 22b for engageably supporting the hole-side member (corresponds to the second member in the claims) at the outer periphery of the outer ring 222, and a third rotation member face 22c capable of engageably supporting another hole-side member (corresponds to the third member in the claims) at the inner periphery of the outer ring 222.

Thus, according to the aforementioned bearing 22, in addition to being disposed between the shaft-side member and hole-side member which rotate relatively and engageably supporting such members, it is possible to engageably support on the same rotation axis another hole-side member with the same rotation as the other hole-side member (when the hole-side member is not rotating, the other hole-side member also stands still) at the third rotation member face 22c.

The bearing 23 shown in FIG. 6 is constituted by comprising an inner ring 231, an outer ring 232, and a ball 235 which rolls between and is rollably and rotatably sandwiched between such bearing rings 231 and 232. The inner and outer rings are respectively formed to extend in opposite directions, and two third rotation member faces 23c are formed on the outer peripheral face of the protruding inner ring 231 and the inner peripheral face of the protruding outer ring 232. This bearing 23 comprises a first rotation member face 23a for engageably supporting the shaft-side member at the inner periphery of the inner ring 231, a second rotation member face 23b for engageably supporting the hole-side member at the outer periphery of the outer ring 232, and two third rotation member faces 23c and 23c capable of engageably supporting another shaft-side member and a hole-side member (corresponds to the third member in the claims), respectively, at the outer periphery of the inner ring 231 and the inner periphery of the outer ring 232.

Thus, according to the aforementioned bearing 23, in addition to being disposed between the shaft-side member and hole-side member which rotate relatively and engageably supporting such members, it is possible to engageably support on the same rotation axis another shaftside member or hole-side member with the same rotation (or standstill) as the other shaft-side member or hole-side member at the third rotation member faces 23c and 23c.

Therefore, with these types of bearing structures as well, it is possible to obtain a bearing structure in an extremely simple and small configuration similar to the embodiments described above and which is capable of supporting the third member on the same rotation axis.

Although a torque converter pump was adopted as an example of a rotor in the aforementioned embodiments to describe the bearing which rotatably supports such rotor, the rotor is not limited to this type of member and may be other mechanical elements; for example, gears or pulleys, as well as a component wherein the shaft-side member is fixed and the hole-side member is rotatable. Moreover, although a radial ball bearing exemplified the rolling element as an example the bearing in the respective embodiments, the rolling element may also be structured of a cylindrical roller bearing or a needle roller bearing.

As described above, according to the present invention, the bearing structure comprises: an inner ring; an outer ring disposed on the outer periphery of the inner ring; and a rolling element rotatably sandwiched between the inner ring and the outer ring; and which is capable of supporting a first member mounted on the inner periphery of the inner ring and a second member mounted on the outer periphery of the outer ring in a relative and rotatable manner; wherein at least the inner ring or the outer ring is formed to protrude more in the rotation axis direction in the aforementioned relative and rotatable manner than other outer rings or inner rings; and wherein a supporter for engageably supporting a third member which integrally rotates with the inner ring or the outer ring or which stands still is formed on the outer periphery of the inner ring formed to protrude in the rotation axis direction or on the inner periphery of the outer ring formed to protrude in such rotation axis direction. It is therefore possible to provide a bearing structure capable of supporting a third member on the same axis with a simple structure, thereby preventing the structure of the shaft-side member and hole-side member from becoming complex.

Moreover, it is preferable that the third member engages with and is supported by a supporter formed on the outer periphery of the inner ring or a supporter formed on the inner periphery of the outer ring; and is also spline-engaged with the first member mounted on the inner periphery of the inner ring or the second member mounted on the outer periphery of the outer ring. According to this type of structure, the third member is able to secure the coaxiality of the mount position with the first and second members by being engageably supported by the third member support formed on the bearing, and receive the transmittance of the rotational driving force of the first member by spline-engaging with such first member. Accordingly, it is possible to provide a simple bearing structure capable of solving the aforementioned problems without complicating the structure of the rotation axis and the like and without generating vibration or noise.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2000-178671 filed on Jun. 14, 2000, which is incorporated herein by reference.

What is claimed is:

1. A bearing structure, comprising:
an inner ring;
an outer ring coaxially disposed on the outer periphery of said inner ring;
a rolling element rollably sandwiched between said inner ring and said outer ring;
a supporting part of said inner ring integrally formed with and protruding axially from said inner ring;
wherein,
said inner ring being capable of supporting a first member on its inner periphery;
said outer ring being capable of supporting a second member on its outer periphery in a relatively rotatable manner to said first member;
said supporting part being capable of coaxially supporting a third member and also being integrally and coaxially rotatable with said at least one of said inner ring and said outer ring, wherein said supporting part protrudes in a direction of a rotational axis of the bearing structure and is coaxial with a rotational axis of the inner and outer rings,
wherein a periphery region of said supporting part to which the third member is being fitted, is concentric with the inner periphery of the inner ring as well as the outer periphery of the outer ring; and
wherein the bearing structure is a radial bearing which supports radial loads.

2. A bearing structure according to claim 1, wherein said third member is spline-engaged with the first member mounted on the inner periphery of said inner ring.

3. A bearing structure according to claim 1, wherein said outer ring includes an inner race way, said inner ring includes an outer race way, said rolling element is formed of a plurality of balls sandwiched and set between said inner race way and said outer race way, and, as a whole, comprises a radial ball bearing.

4. A bearing structure according to claim 1, wherein said outer ring constitutes an outer race, said inner ring constitutes an inner race, said rolling element is formed of a plurality of rollers sandwiched and arranged between said inner race and said outer race.

5. A bearing structure according to claim 1,
wherein said inner ring is formed such that the width in the axial direction thereof is longer than the width in the axial direction of said outer ring and protrudes in the axial direction, a fit-engagement/support peripheral face is formed on the outer peripheral face of said inner ring protruding in this way, and said engagement/support peripheral face constitutes said supporting part for engageably supporting said third member.

6. A bearing structure according to claim 1, wherein said outer ring is formed such that the width in the axial direction thereof is longer than the width in the axial direction of said inner ring and protrudes in the axial direction, an engagement/support peripheral face is formed on the inner peripheral face of said outer ring protruding in this way, and said engagement/support peripheral face constitutes said supporter for engageably supporting said third member.

7. A bearing structure according to claim 1, wherein said inner ring and said outer ring respectively protrude in axially opposite directions, two engagement/support peripheral faces are formed on the outer peripheral face of said inner ring and on the inner peripheral face of said outer ring which protrude in this way, and said two engagement/support peripheral faces respectively constitute said supports for engageably supporting said third member.

8. A bearing structure, comprising:
an inner ring;
an outer ring coaxially disposed on the outer periphery of said inner ring;
a rolling element rollably sandwiched between said inner ring and said outer ring;
a supporting part integrally formed with and protruding axially from at least one of said inner ring and said outer ring;
wherein,
said inner ring being capable of supporting a first member on its inner periphery;
said outer ring being capable of supporting a second member on its outer periphery in a relatively rotatable manner to said first member;
said supporting part being capable of coaxially supporting a third member and also being integrally and coaxially rotatable with said at least one of said inner ring and said outer ring,
wherein said first member consists of a pump impeller hub connected to the pump impeller of a torque converter, said second member consists of a case for supporting said torque converter, and said third member consists of a rotation member which is spline-engaged with and mounted on said pump impeller hub and which rotates integrally with said pump impeller hub.

9. A bearing structure according to claim 8, wherein said rotation member consists of a drive sprocket for driving, via a chain mechanism, a hydraulic pump mount on said case.

10. A bearing structure according to claim 8, wherein said third member is spline-engaged with the first member mounted on the inner periphery of said inner ring or the second member mounted on the outer periphery of said outer ring.

11. A bearing structure according to claim 8, wherein said outer ring constitutes an outer race, said inner ring constitutes an inner race, said rolling element is formed of a plurality of balls sandwiched and set between said inner race and said outer race, and, as a whole, constitute a radial ball bearing.

12. A bearing structure according to claim 8, wherein said outer ring constitutes an outer race, said inner ring constitutes an inner race, said rolling element is formed of a plurality of rollers sandwiched and arranged between said inner race and said outer race.

13. A bearing structure according to claim 8, wherein said inner ring is formed such that the width in the axial direction thereof is longer than the width in the axial direction thereof is longer than the width in the axial direction of said outer ring and protrudes in the axial direction, a fit-engagement/support peripheral face is formed on the outer peripheral face of said inner ring protruding in this way, and said engagement/support peripheral face constitutes said supporter for engageably supporting said third member.

* * * * *